No. 640,487. Patented Jan. 2, 1900.
V. A. PERNOT.
BICYCLE SUPPORT.
(Application filed Jan. 19, 1899.)
(No Model.)
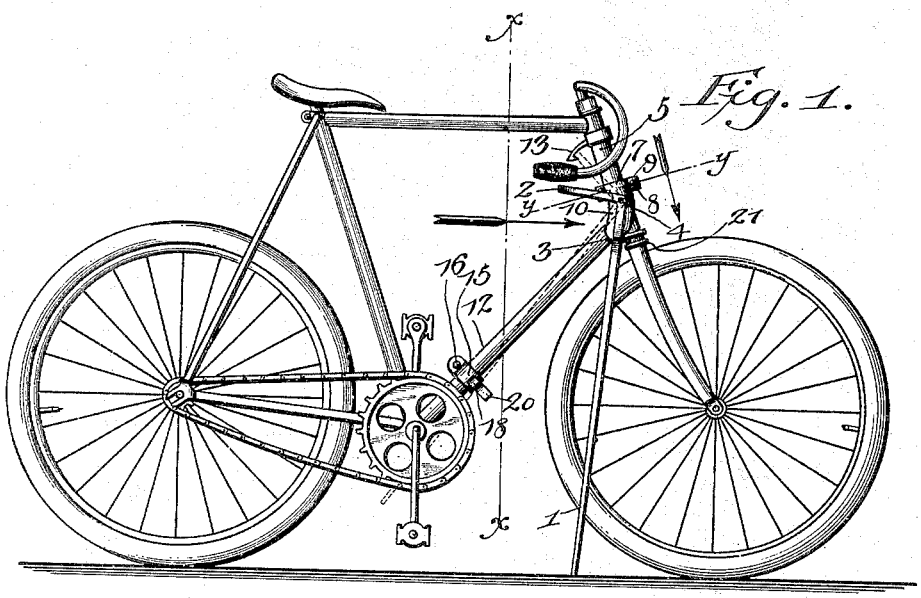
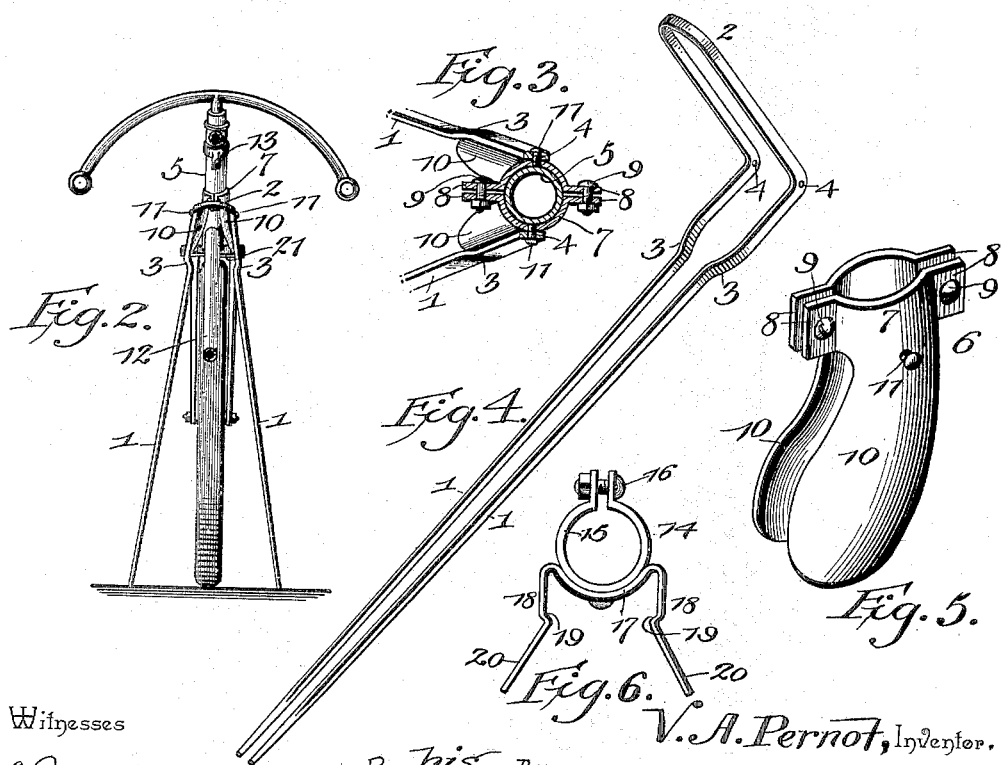
Witnesses
By his Attorneys,
V. A. Pernot, Inventor.

UNITED STATES PATENT OFFICE.

VICTOR A. PERNOT, OF COLEGROVE, CALIFORNIA.

BICYCLE-SUPPORT.

SPECIFICATION forming part of Letters Patent No. 640,487, dated January 2, 1900.

Application filed January 19, 1899. Serial No. 702,686. (No model.)

*To all whom it may concern:*

Be it known that I, VICTOR A. PERNOT, a citizen of the United States, residing at Colegrove, in the county of Los Angeles and State of California, have invented a new and useful Bicycle-Support, of which the following is a specification.

This invention relates to bicycle-supports of that class which are carried upon the frame of the bicycle.

The object of the present invention is to provide an improved form of support which is mounted upon the frame of the bicycle in convenient reach of the rider, whereby the device may be adjusted to hold the bicycle in an upright position without the necessity of dismounting, as well as after having dismounted.

A further object is to mount the device so that when in use to support the bicycle it will engage the front forks and prevent the same from being accidentally turned and the front wheel thrown transversely of the plane of the bicycle.

To these ends the invention consists in the combination and arrangement of the several parts, as will be hereinafter more fully described, particularly pointed out in the claims, and shown in the drawings.

In the drawings, Figure 1 is a side view of a bicycle having the support applied thereto, the full lines showing the support in use and the dotted lines its position when not in use. Fig. 2 is a vertical sectional view on the line *x x*, Fig. 1. Fig. 3 is a detail transverse section taken on the line *y y*, Fig. 1. Fig. 4 is a detail perspective view of the legs of the support. Fig. 5 is a detail perspective view of the spreader-clamp. Fig. 6 is a detail view of the spring-clamp for holding the legs of the support when not in use.

Corresponding parts are designated by like characters of reference in all the figures of the drawings.

Referring to the accompanying drawings, particularly to Fig. 4 thereof, the support comprises opposite legs 1 and an operating-handle 2 and is preferably formed from a single length of metal bent intermediate its ends to form the handle 2, the sides of which are bent in the same respective planes upon the same side and at approximately right angles thereto to form the opposite legs 1, whereby approximately L-shaped standards are formed. As indicated at 3, each leg is deflected inward at a suitable distance below the vertex of the angle between the handle and the legs to bring the free ends thereof close together. Suitable openings 4 are formed through the legs at their juncture with the handle, whereby the support is mounted upon the head 5 of the frame of the bicycle.

The support is mounted upon the frame of a bicycle by means of a clamp 6, which is illustrated in detail in Fig. 5 and comprises two opposite duplicate members. Each member is formed of a single piece of pressed steel, having a semicircular clamping-band provided with opposite ears 8, which are adapted to receive suitable screw-fastenings 9 to connect the members together and clamp them upon the head of the frame, and pendent spreader-wings 10, flaring outwardly and rearwardly and having a convexed transverse contour. A suitable removable and headed pivot-pin 11 is provided for each member, carried by the wing thereof and extending outwardly therefrom.

To mount the support upon a bicycle, a spreader-clamp, as heretofore described, is fitted to the head 5 of the frame immediately above the lower reach 12, with the spreader-wings 10 extending rearwardly. The standards of the support are then pivoted to opposite sides of the clamp 6 by means of the pivot-pins 11 passing through the respective openings 4 in the legs. A suitable spring-catch 13 is provided upon the head 5 of the frame, above the clamp 6, extending rearwardly and adapted to engage the bend of the handle 2, as indicated in dotted lines, whereby the legs are normally held up out of engagement with the ground or floor. To confine the free ends of the legs and prevent them from swinging about, a spring-clamp 14 is provided upon the lower reach 12 and adapted to engage the legs, as shown. The preferred form of this clamp is shown in Fig. 6 and comprises a clamping-band 15, having a screw 16, whereby the band may be fitted to the reach, and a plate 17, connected intermediate its ends to the lower side of the clamp and bent to form loops 18 at opposite sides of the clamp, each loop having an inwardly-extending shoulder 19 and an outwardly-extending guide-wing 20. It will be understood that the loops and wings form spring-fingers, and the legs of the support are adapted to be swung upward and be confined within the respective loops 18 by means of their spring action and the shoulders 19 thereof.

The support being held up in the position indicated in dotted lines, it is simply necessary for the rider to press downward upon the handle 2 with his hand or foot without dismounting, and the support will be disengaged from both the spring-catch 13 and the clamp 14 and will be forced downward upon its pivotal connection with the spreader-clamp 6, the legs engaging upon their inner faces the opposite spreader-wings 10, whereby the legs are automatically spread and held apart, resting against the opposite rear sides of the crown 21 of the front forks and engaging the ground, with their lower ends spread apart transversely of the plane of the frame of the bicycle. The bicycle is firmly held in an upright position, as it is braced transversely at opposite sides, and the front wheel is effectually prevented from being accidentally turned to one side by reason of the fact that the leg-standards are located in the path of the axial movement of the front forks and also in engagement with the crown thereof when the device is in use. This feature of supporting the front wheel, as described, is an essential and highly important improvement, as it is a well-known fact that when a bicycle is left standing the front forks and wheel will frequently turn to one side, which will cause the bicycle to fall down, resulting in damage thereto and considerable annoyance to the rider. To return the support to its normal position, the handle 2 is forced upward, which will draw the legs upward also, and by reason of the spring imparted to them by being spread apart by the spreader-wings the legs will resume their normal approximately parallel position and engage the spring-clamp 14 without further attention. Thus it is necessary to operate the handle 2 only in order that the support may be thrown in or out of use, the legs being conveniently held out of the way of the rider and the handle under his easy control.

By reason of the transversely-convexed contour or shape of the spreader-wings the leg-standards are adapted to come close together in the elevated position of the support, so as to permit of the engagement of the leg-standards with the spring-clamp 14.

The present device provides an inexpensive, efficient, and durable bicycle-support composed of few parts, all of which are connected in a substantial manner to the frame of the bicycle, out of the way of the rider and within his control, without the necessity of dismounting from the bicycle.

Various changes in the form, proportion, and minor details of construction and arrangement may be made without departing from the spirit and scope or sacrificing any of the advantages of the present invention.

Having thus described the invention, what is claimed is—

1. A bicycle-support, comprising opposite leg-standards pivoted or hinged to the head of a bicycle, and located in the path of the axial movement of the front forks, and also in engagement with the crown thereof, when the leg-standards are in position to support the bicycle, whereby the front wheel is held against being accidentally turned transversely of the bicycle, substantially as shown and described.

2. In a bicycle-support, the combination with a clamp adapted to be fitted to the head of the bicycle, and having pendent divergent spreader-wings and opposite pivot-pins, of a support formed from a single length of metal bent intermediate its ends forming opposite legs, the bend of the support being disposed at an angle thereto and forming a handle, and having openings formed through each leg at the vertex of the angle between the same and the handle, whereby the support is pivoted to the clamp, and means carried by the frame of the bicycle for holding the support out of use, substantially as shown and described.

3. A bicycle-support, comprising opposite leg-standards formed from a single length of metal bent intermediate its ends to provide the standards, the bend thereof being deflected at an angle to the plane of the legs and adapted to provide an operating-handle, and a catch extending rearwardly from the head-tube of the bicycle, the standards being pivoted to the head-tube below the catch and at the vertexes of the angles between the respective standards and the adjacent sides of the handle, whereby the bend between the sides of the handle is adapted to engage the catch and hold the standards in the elevated position thereof, substantially as shown and described.

4. In a bicycle-support, the combination with opposite leg-standards, of a spreader adapted to be carried by the head-tube of the bicycle, and comprising opposite clamp members having pendent divergent transversely-convexed wings, the leg-standards being pivoted to opposite sides of the spreader near the upper end thereof, and adapted to be moved in engagement with and transversely across the wings of the spreader, whereby the convex shape thereof permits of the standards coming close together in the elevated position thereof, substantially as shown and described.

In testimony that I claim the foregoing as my own I have hereto affixed my signature in the presence of two witnesses.

VICTOR A. PERNOT.

Witnesses:
ENOCH PEPPER,
FELIX CONSTANT.